US012670608B2

(12) United States Patent　　　　(10) Patent No.:　US 12,670,608 B2
Sakai et al.　　　　　　　　　　　(45) Date of Patent:　Jun. 30, 2026

(54) OBJECT RECOGNITION APPARATUS AND OBJECT RECOGNITION METHOD

(71) Applicant: Hitachi, Ltd., Tokyo (JP)

(72) Inventors: Ryo Sakai, Tokyo (JP); Nobutaka Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 374 days.

(21) Appl. No.: 18/554,783

(22) PCT Filed: Apr. 21, 2022

(86) PCT No.: PCT/JP2022/018380
§ 371 (c)(1),
(2) Date: Oct. 10, 2023

(87) PCT Pub. No.: WO2022/230747
PCT Pub. Date: Nov. 3, 2022

(65) Prior Publication Data
US 2024/0119618 A1　　Apr. 11, 2024

(30) Foreign Application Priority Data
Apr. 27, 2021　　(JP) ................................. 2021-075362

(51) Int. Cl.
G06T 7/62　　　　(2017.01)
G06Q 10/08　　　(2024.01)
G06T 7/70　　　　(2017.01)
(52) U.S. Cl.
CPC ............... G06T 7/62 (2017.01); G06Q 10/08 (2013.01); G06T 7/70 (2017.01); G06T 2207/10024 (2013.01); G06T 2207/10028 (2013.01)

(58) Field of Classification Search
CPC ... G06T 7/62; G06T 7/70; G06T 2207/10024; G06T 2207/10028; G06T 7/00; G06Q 10/08
See application file for complete search history.

(56) References Cited

U.S. PATENT DOCUMENTS

2017/0217620 A1*　8/2017　Zeilstra ................... B65B 43/08
2019/0197719 A1*　6/2019　Barish .................... G06V 10/50
(Continued)

FOREIGN PATENT DOCUMENTS

CN　　　　109919424 A　*　6/2019
JP　　　　2006-105777 A　　4/2006
(Continued)

OTHER PUBLICATIONS

Chinese-language Office Action issued in Chinese Application No. 202280027045.0 dated Jul. 4, 2025, with English translation (14 pages).
(Continued)

*Primary Examiner* — Delomia L Gilliard
(74) *Attorney, Agent, or Firm* — Crowell & Moring LLP

(57) ABSTRACT

The present invention comprises: an input unit that enters scene information indicating the state of a prescribed scene in a container that stores an object; a processing unit that, on the basis of the scene information entered into the input unit, sorts objects in the container by size and, on the basis of the number of sorted objects of different sizes, detects objects of sizes that are not acceptable for storage in the container; and an output unit that outputs the results of processing by the processing unit.

11 Claims, 12 Drawing Sheets

(56) References Cited

U.S. PATENT DOCUMENTS

| | | | |
|---|---|---|---|
| 2020/0078935 A1 * | 3/2020 | Kimura | B25J 9/10 |
| 2020/0193336 A1 * | 6/2020 | Capoia | G06Q 10/043 |
| 2021/0047115 A1 * | 2/2021 | Aiglstorfer | B25J 9/1666 |
| 2022/0016779 A1 * | 1/2022 | Wang | G06N 3/0464 |

FOREIGN PATENT DOCUMENTS

| | | |
|---|---|---|
| JP | 2019-57211 A | 4/2019 |
| JP | 2020-34526 A | 3/2020 |

OTHER PUBLICATIONS

International Search Report (PCT/ISA/210) issued in PCT Application No. PCT/JP2022/018380 dated Jul. 12, 2022 with English translation (4 pages).

Japanese-language Written Opinion (PCT/ISA/237) issued in PCT Application No. PCT/JP2022/018380 dated Jul. 12, 2022 with English translation (6 pages).

* cited by examiner

[FIG. 1]
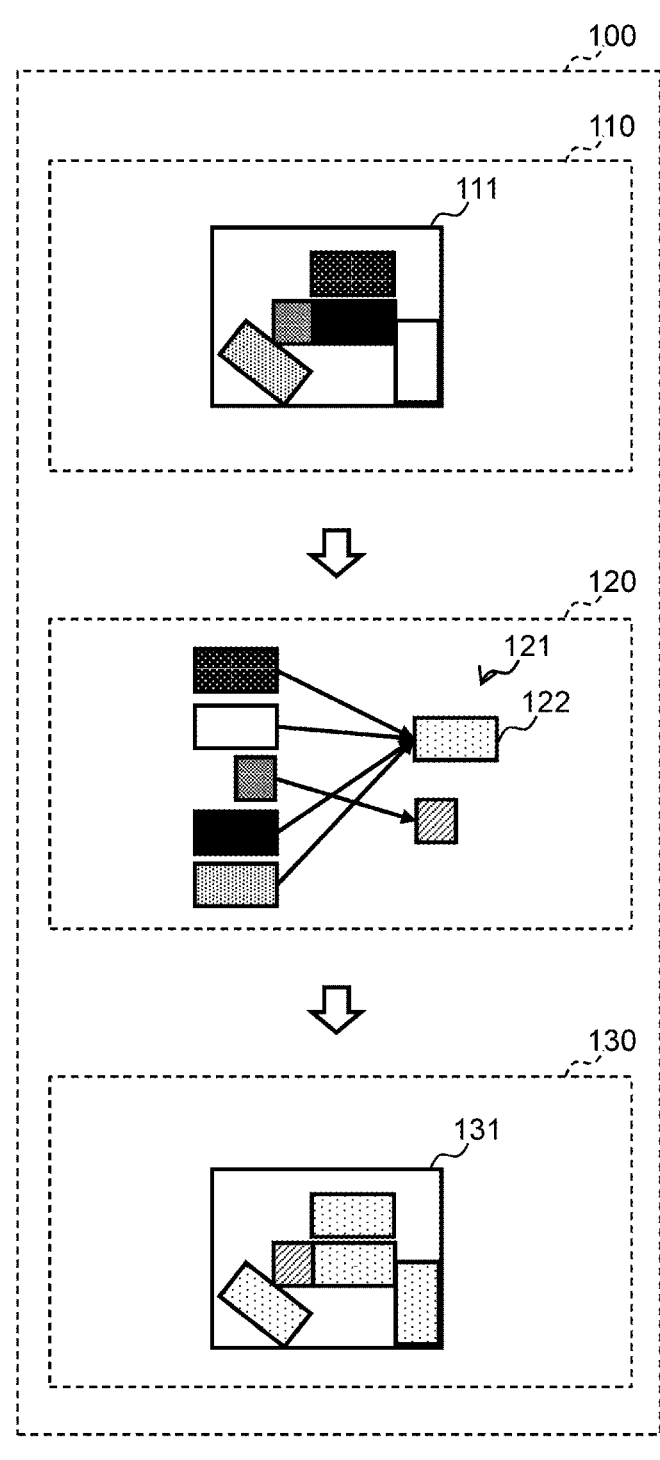

[FIG. 2]
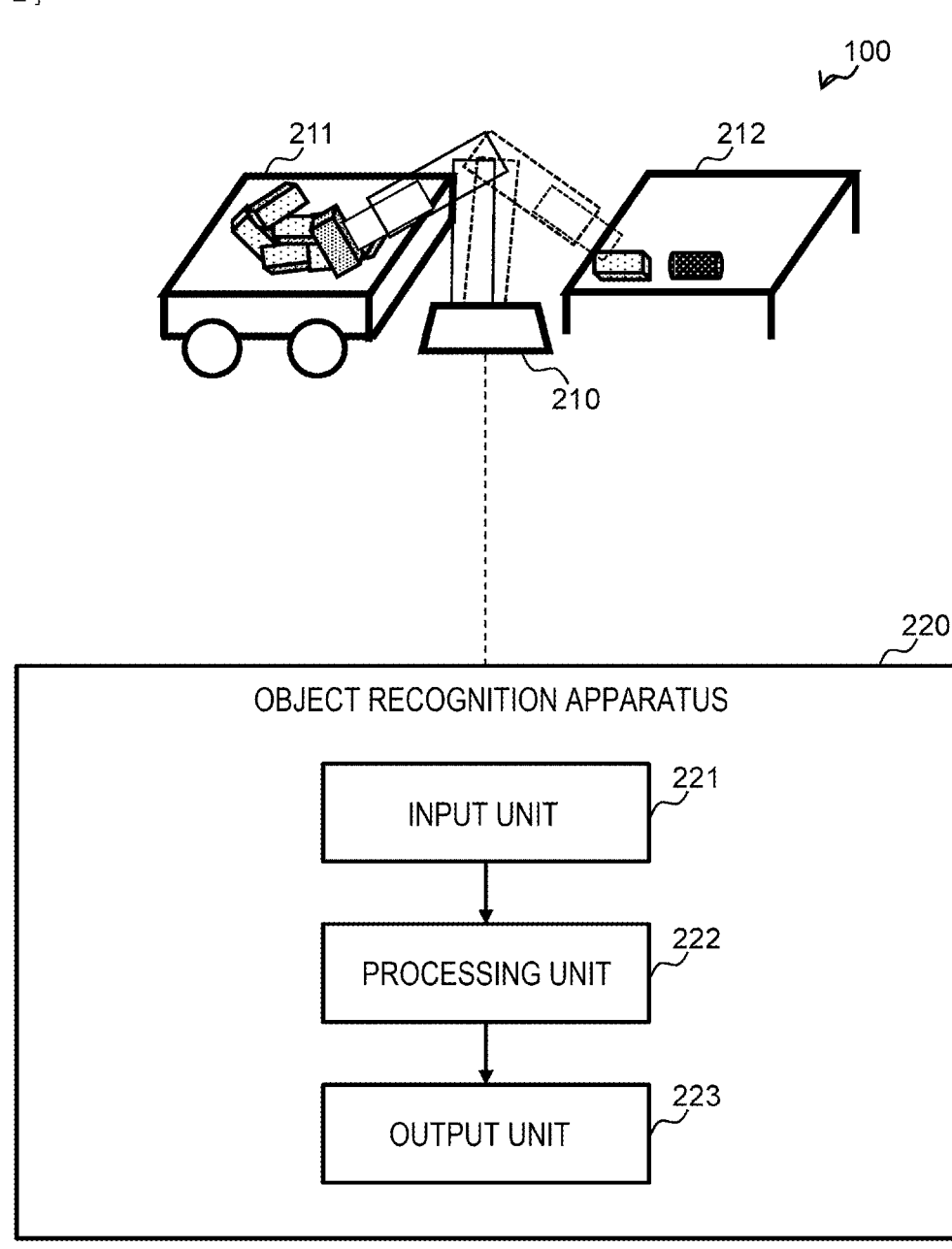
OBJECT RECOGNITION APPARATUS
INPUT UNIT
PROCESSING UNIT
OUTPUT UNIT

[FIG. 3]
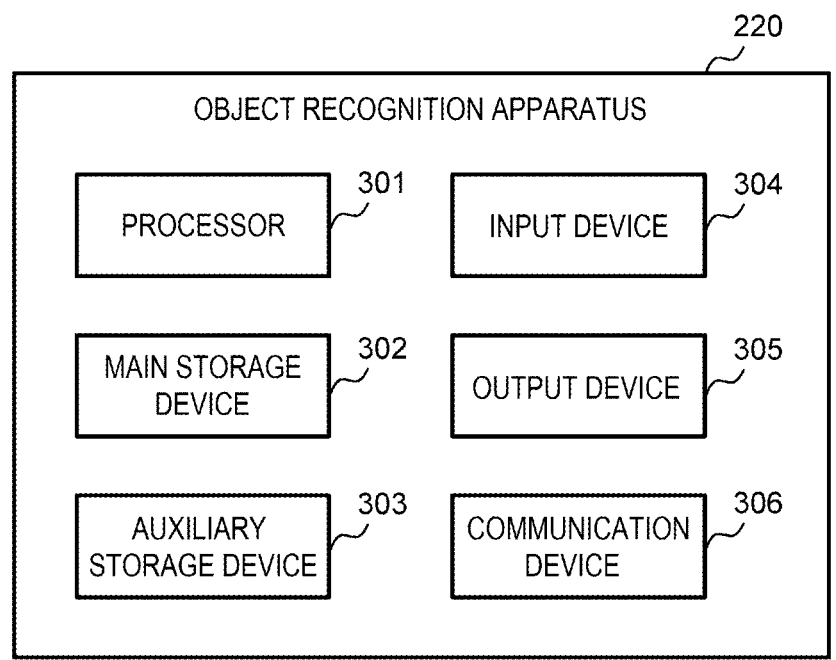

[FIG. 4]
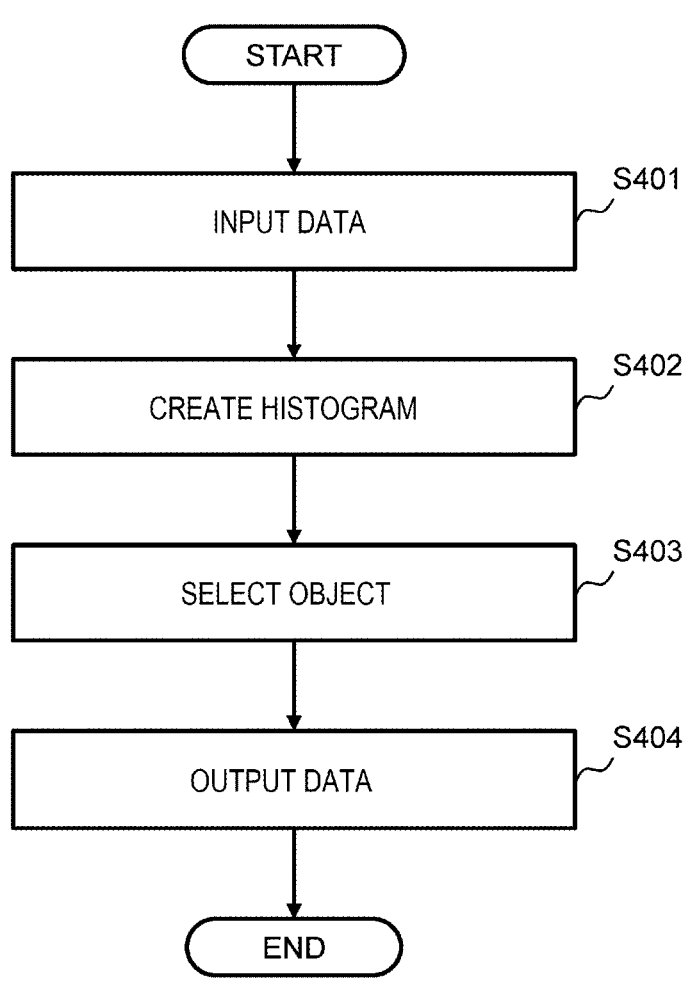

[FIG. 5]
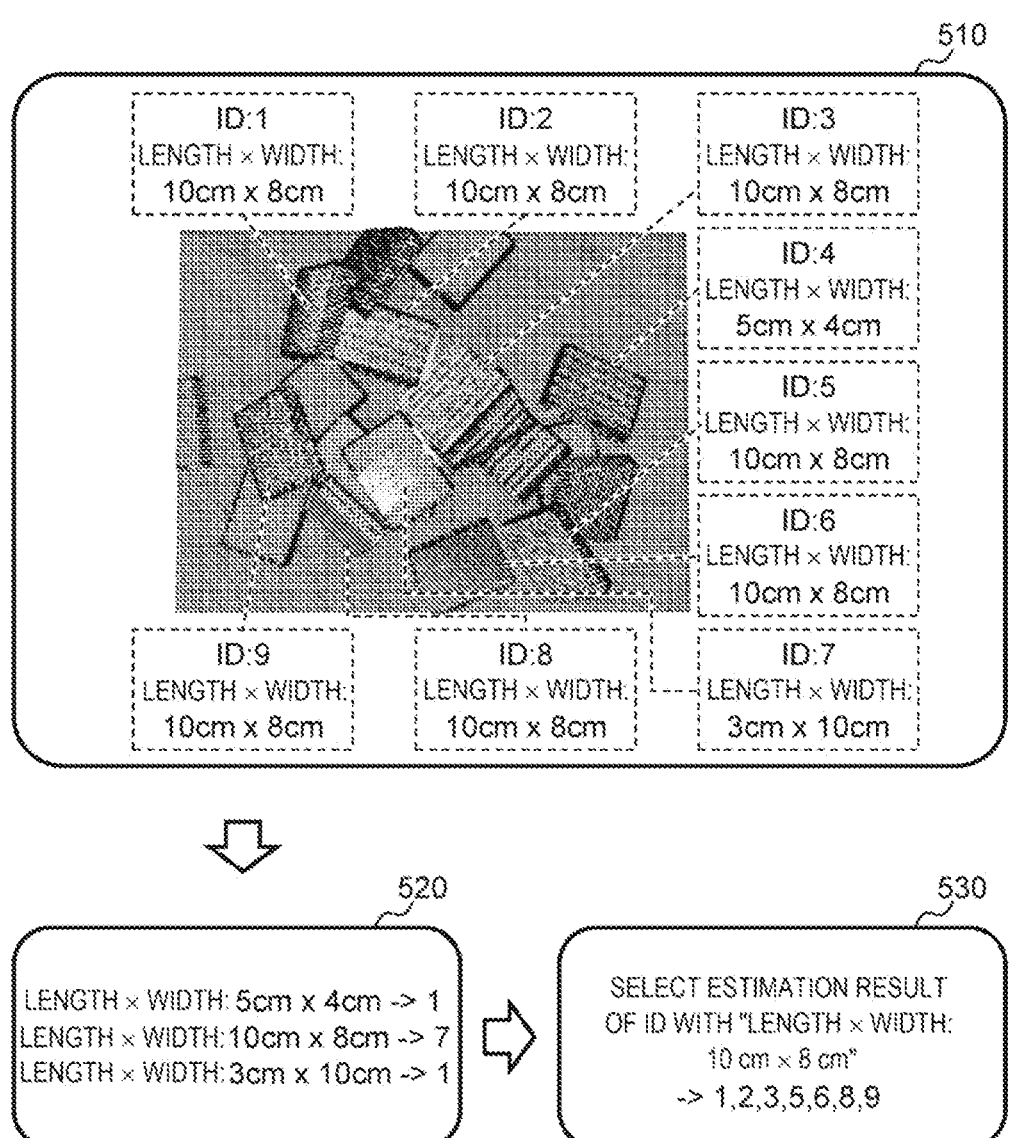

[FIG. 6]
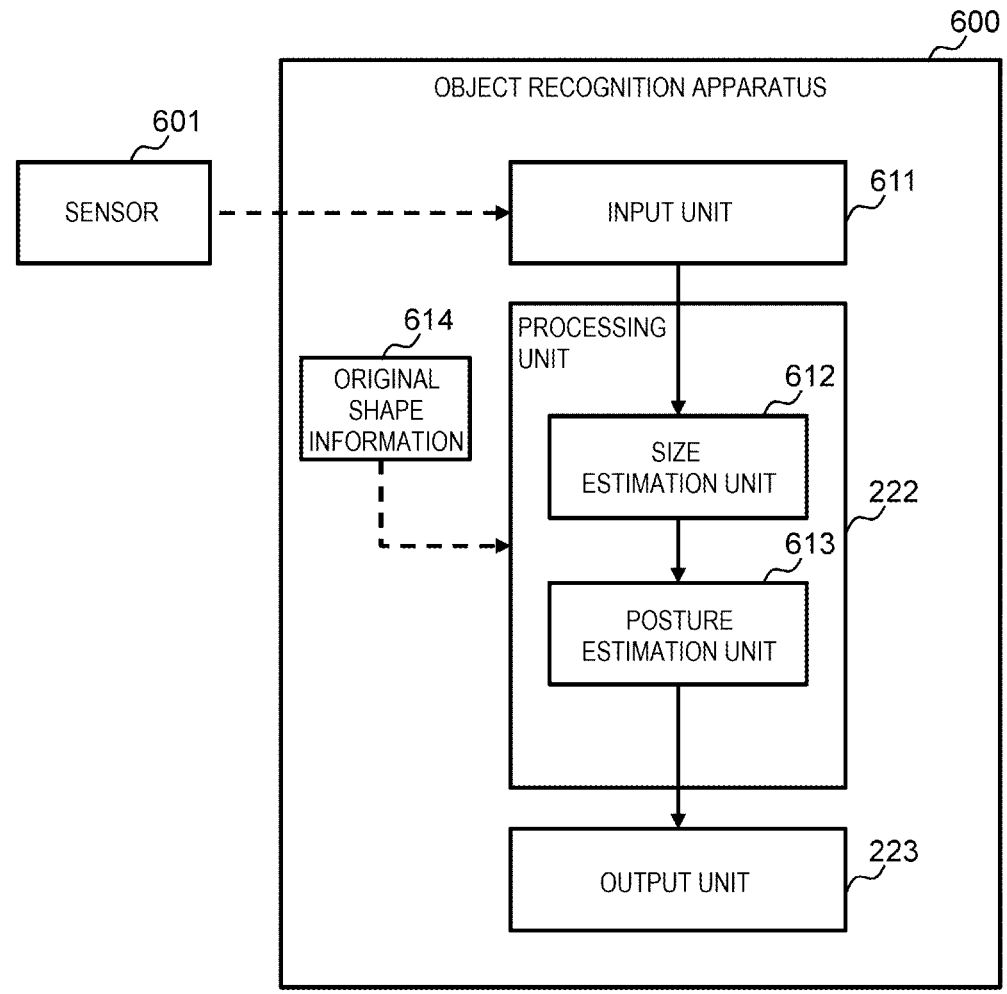

[FIG. 7]
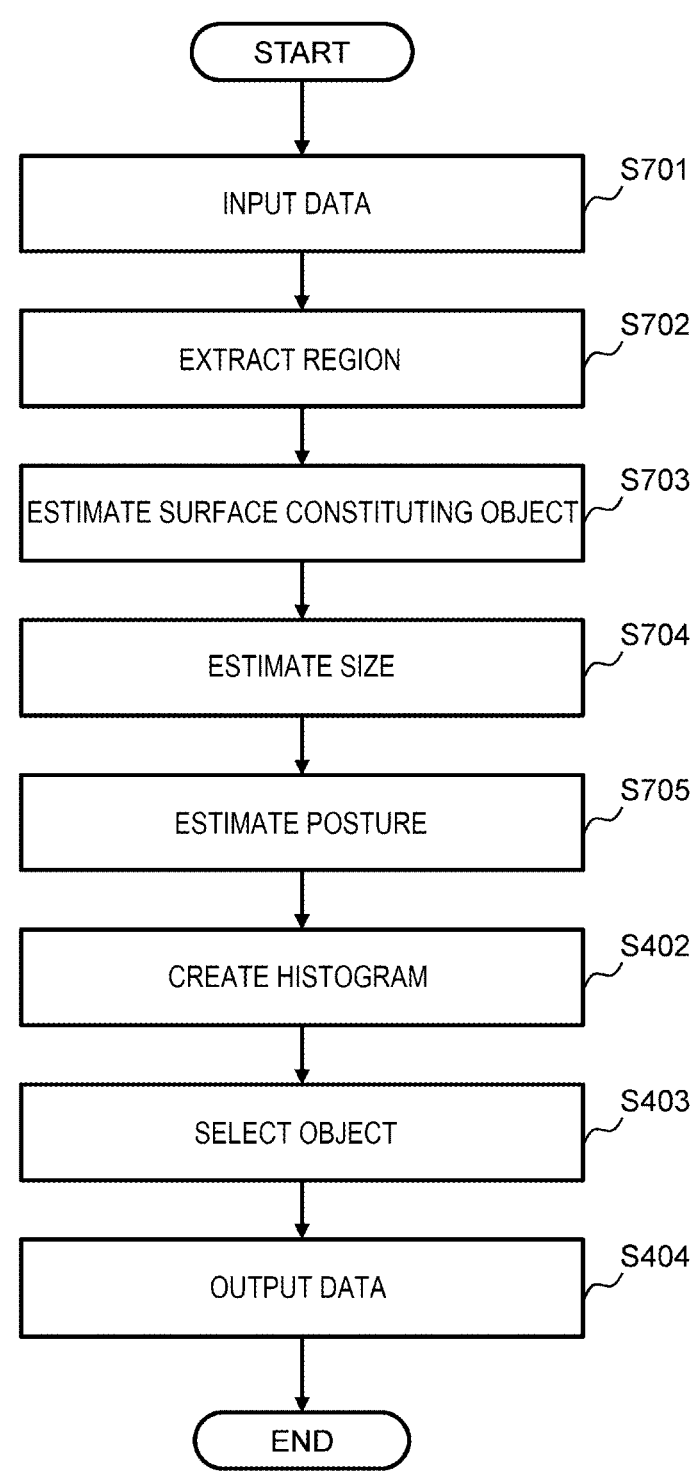

[FIG. 8]
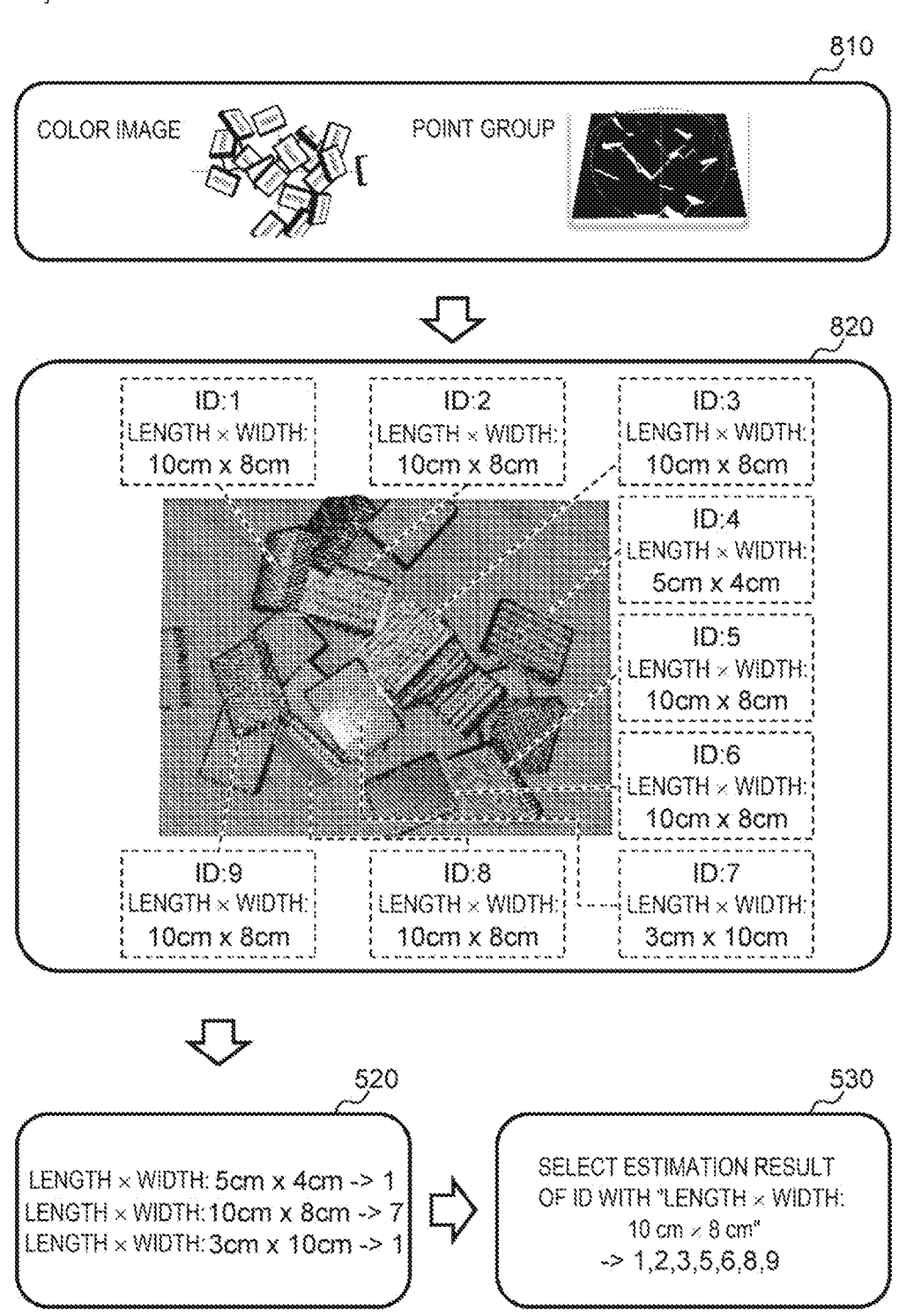

[FIG. 9]
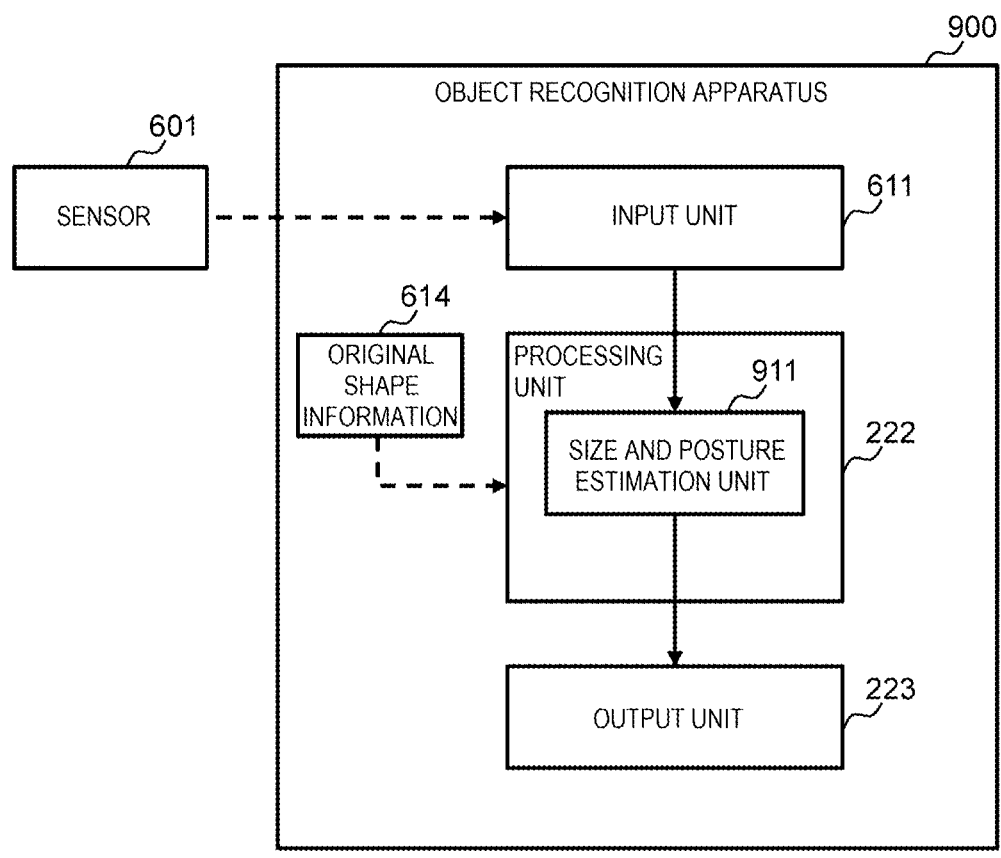

[FIG. 10]
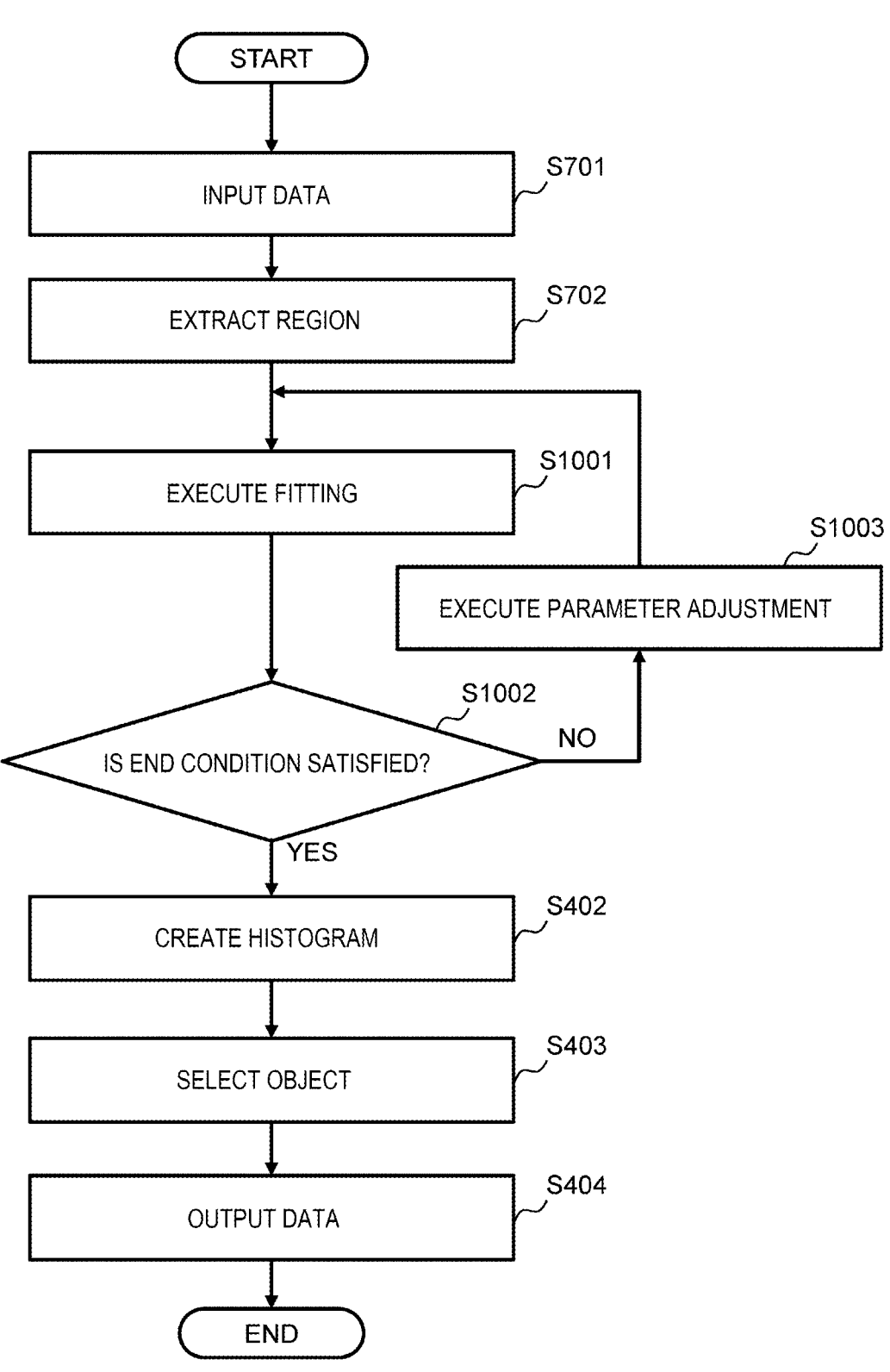

[FIG. 11]
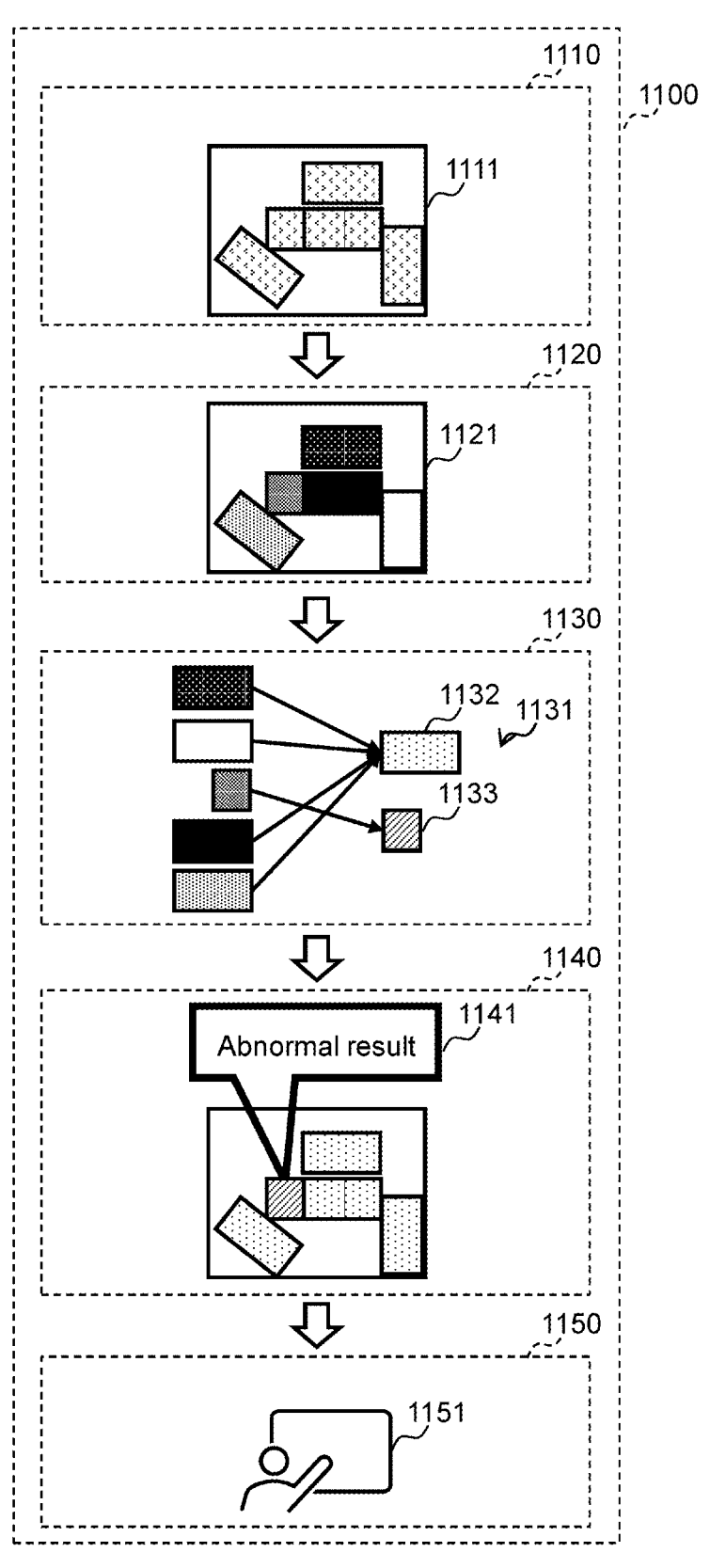

[FIG. 12]
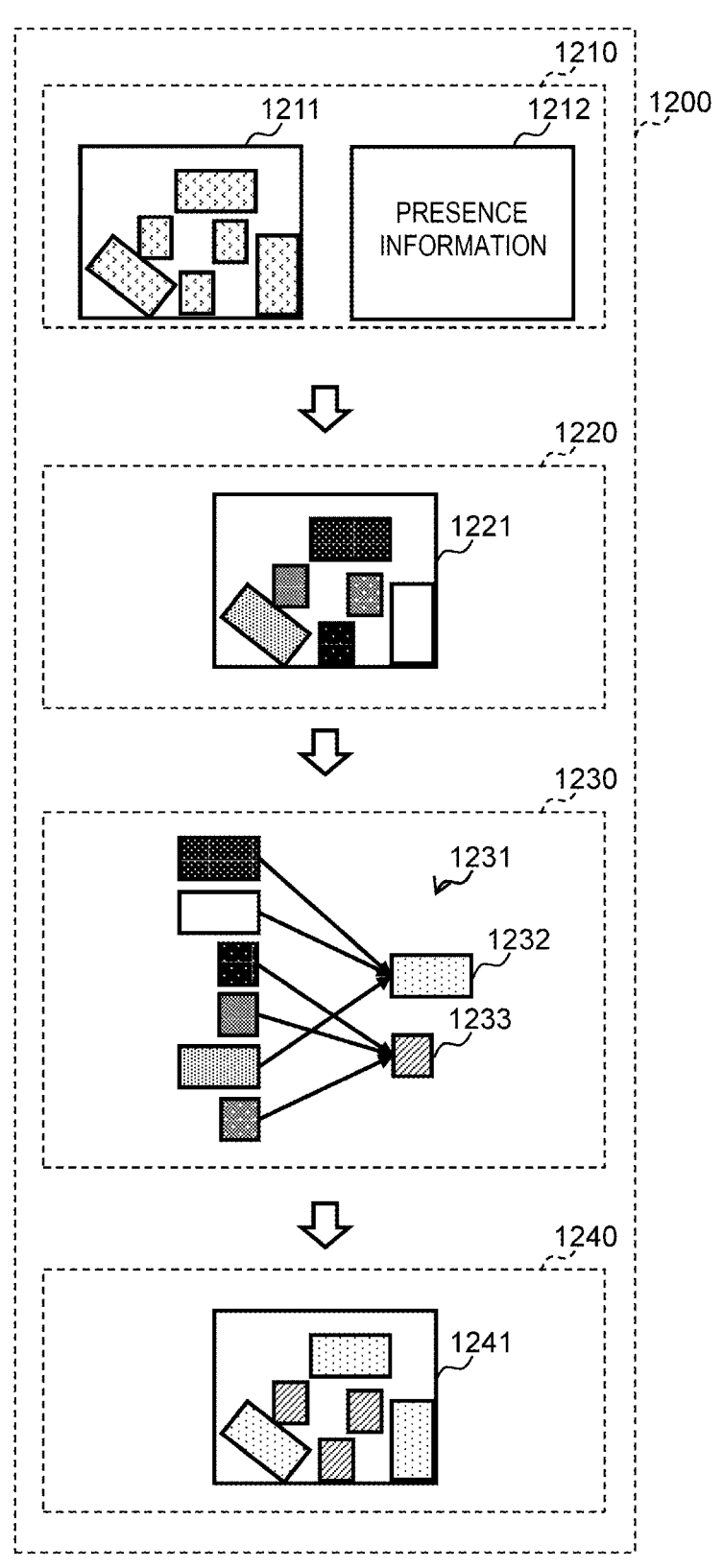

OBJECT RECOGNITION APPARATUS AND OBJECT RECOGNITION METHOD

TECHNICAL FIELD

The present invention generally relates to recognition of an object present in a container.

BACKGROUND ART

In related art, in fields such as logistics, warehouses are equipped with robots that take out products from storage boxes based on orders. Since objects of the same type are stored in a storage box by various packing methods, a robot needs to estimate a posture of a product and a size of the product. When the posture of the product is not known, the robot cannot, for example, move a hand thereof toward the product that the robot wants to grip without colliding. When the size of the product is not known, the robot cannot, for example, take out the product while avoiding an obstacle such as another product after gripping the product.

In recent years, a method for estimating a posture and a size of a product using a product model is known. According to this method, since the product model is provided, the size of the product is known, and there is no need to estimate the size of the product. However, since the product model needs to be created for each product type, the more product types there are, the more man-hours are required to create the product model.

In this regard, there is disclosed a position and posture recognition apparatus capable of recognizing a position and a posture of a randomly stacked workpiece with a small amount of calculation and using a SCARA robot with little control information (see PTL 1). According to the position and posture recognition apparatus, since the workpiece to be gripped is limited to a substantially cylindrical shape, point cloud data is generated based on a three-dimensional image of the randomly stacked workpiece, and a size and the position and posture of the workpiece are calculated based on the point cloud data, there is no need to prepare a model or the like in advance.

CITATION LIST

Patent Literature

PTL 1: JP2020-34526A

SUMMARY OF INVENTION

Technical Problem

In the technique disclosed in PTL 1, a posture and a size of an object are estimated by fitting an original shape of a substantially cylindrical workpiece to input data based on information on the original shape. However, even if a part of the object is hidden, the original shape can often be accurately fitted, and since there is no reference object model, there is a problem that it cannot be determined whether the estimated size of the object is correct.

The invention has been made in view of the above points, and an object thereof is to provide an object recognition apparatus or the like capable of accurately recognizing an object even if there is no reference object model.

Solution to Problem

According to an aspect of the invention, there is provided an information processing apparatus including: an input unit configured to input scene information indicating a state of a predetermined scene in a container that stores an object; a processing unit configured to execute processing of selecting an object present in the container for each size based on the scene information received from the input unit, and detecting an object having a size unallowable for storage in the container based on the number of selected objects for each size; and an output unit configured to output a result of the processing executed by the processing unit.

In the above configuration, since the object having the size unallowable for storage in the container is detected based on the number of objects for each size, for example, even when there is no reference object model, it is possible to exclude, from the container, the object having the size unallowable for storage in the container.

Advantageous Effects of Invention

According to the invention, it is possible to accurately recognize an object even if there is no reference object model.

BRIEF DESCRIPTION OF DRAWINGS

FIG. 1 is a diagram showing an example of processing executed by an object recognition system according to a first embodiment.

FIG. 2 is a diagram showing an example of a configuration of the object recognition system according to the first embodiment.

FIG. 3 is a diagram showing an example of a hardware configuration of an object recognition apparatus according to the first embodiment.

FIG. 4 is a diagram showing an example of object recognition processing according to the first embodiment.

FIG. 5 is a diagram showing a result image according to the first embodiment.

FIG. 6 is a diagram showing an example of a configuration of an object recognition apparatus according to a second embodiment.

FIG. 7 is a diagram showing an example of object recognition processing according to the second embodiment.

FIG. 8 is a diagram showing a result image according to the second embodiment.

FIG. 9 shows an example of a configuration of an object recognition apparatus according to a third embodiment.

FIG. 10 is a diagram showing an example of object recognition processing according to the third embodiment.

FIG. 11 is a diagram showing an example of processing executed by an object recognition apparatus according to a fourth embodiment.

FIG. 12 is a diagram showing an example of processing executed by an object recognition apparatus according to a fifth embodiment.

DESCRIPTION OF EMBODIMENTS

(I) First Embodiment

Hereinafter, an embodiment of the invention will be described in detail. However, the invention is not limited to embodiments.

An object recognition apparatus according to the present embodiment receives scene information on a scene in which an object is present in a container. The scene information includes an estimation result of a size of the object. An object recognition apparatus specifies the size of the object present in the scene based on the number of objects for each size.

According to the above configuration, it is possible to exclude an estimation result of a size unallowable in the scene from estimation results of sizes of objects included in the scene information, and to select an estimation result of a correct size of an object.

Notations such as "first", "second", "third", and the like in the present specification and the like are attached to identify components, and the number or order is not necessarily limited. A number for identifying a component is used for each context, and the number used in one context does not necessarily indicate the same configuration in another context. This does not preclude a component identified by a certain number from also functioning as a component identified by another number.

Next, the embodiments of the invention will be described with reference to the drawings. The following description and drawings are examples illustrating the invention, and are appropriately omitted and simplified for clarity of the description. The invention can be implemented in various other forms. Unless otherwise specified, each component may be single or plural.

In the following description, the same elements in the drawings are denoted by the same reference numerals, and description thereof will be appropriately omitted.

In FIG. 1, a reference numeral 100 denotes an object recognition system according to a first embodiment as a whole. FIG. 1 is a diagram showing an example of processing executed by the object recognition system 100.

The object recognition system 100 executes input processing 110, selection processing 120, and output processing 130.

In the input processing 110, the object recognition system 100 inputs, as scene information, data on a scene (target scene) on which object recognition is to be executed. The scene information includes an estimation result 111. The estimation result 111 includes information indicating a result of estimating a size of an object included in the target scene. The estimation of the size of the object included in the target scene will be described by taking, as an example, a case executed in a robot 210 to be described later, and is not limited thereto. For example, the size of the object included in the target scene may be estimated in the object recognition system 100, or may be estimated by a system, a computer, or the like different from the object recognition system 100.

In the selection processing 120, the object recognition system 100 selects a likely object in the target scene (an object having an allowable size in the target scene) using the estimation result 111 for the target scene (entire scene) to generate a selection result 121. The selection result 121 includes information 122 indicating the object having the allowable size in the target scene. For example, the object recognition system 100 selects the object having the allowable size in the target scene by voting sizes of a plurality of objects.

In the output processing 130, the object recognition system 100 generates a recognition result 131 based on the selection result 121 and outputs the recognition result 131. The recognition result 131 includes information indicating an object having an allowable size in the target scene, information indicating an object having an unallowable size in the target scene, information indicating a posture of the object having the unallowable size in the target scene, information indicating an evaluation for the estimation result 111 (for example, whether an object provided in the target scene is an object having an allowable size in the target scene), and other information.

FIG. 2 is a diagram showing an example of a configuration of the object recognition system 100.

The object recognition system 100 includes a robot 210 and an object recognition apparatus 220. The robot 210 and the object recognition apparatus 220 are communicably connected. The robot 210 and the object recognition apparatus 220 may be connected via a network, or may be connected without a network.

The robot 210 estimates the size and posture of an object in a storage box 211 according to an order (order information), and transmits, to the object recognition apparatus 220, scene information on a target scene including the estimation result 111. When receiving the scene information, the object recognition apparatus 220 generates the selection result 121 using the received scene information, generates the recognition result 131 based on the selection result 121, and transmits the generated recognition result 131 to the robot 210. Based on the recognition result 131, the robot 210 takes out an object having an allowable size in the target scene from the storage box 211, and moves the object to a designated place 212.

Here, in the present embodiment, the storage box 211 basically stores objects having one size (first size). However, when objects are stored in the storage box 211, an object having an erroneous size (a second size different from the first size) may be mixed due to a human error or the like. Even if such a situation occurs, the object recognition apparatus 220 selects an object having an unallowable size in the target scene, and thus the robot 210 can take out (pick) an object having a size matching the order (an object having an allowable size in the target scene) from the storage box 211.

More specifically, the object recognition apparatus 220 includes an input unit 221, a processing unit 222, and an output unit 223, and recognizes an object stored in the storage box 211.

The input unit 221 receives scene information transmitted from the robot 210 and inputs the received scene information. The processing unit 222 executes processing of selecting an object based on the scene information received from the input unit 221. The output unit 223 outputs a result of object selection by the processing unit 222.

FIG. 3 is a diagram showing an example of a hardware configuration of the object recognition apparatus 220.

The object recognition apparatus 220 includes a processor 301, a main storage device 302, an auxiliary storage device 303, an input device 304, an output device 305, and a communication device 306.

The processor 301 is a device that executes arithmetic processing. The processor 301 is, for example, a central processing unit (CPU), a micro processing unit (MPU), a graphics processing unit (GPU), or an artificial intelligence (AI) chip.

The main storage device 302 is a device that stores programs, data, and the like. The main storage device 302 is, for example, a read only memory (ROM) or a random access memory (RAM). The ROM is a static random access memory (SRAM), a non-volatile RAM (NVRAM), a mask read only memory (mask ROM), a programmable ROM (PROM), or the like. The RAM is a dynamic random access memory (DRAM) or the like.

The auxiliary storage device 303 is a hard disk drive, a flash memory, a solid state drive (SSD), an optical storage device, or the like. The optical storage device is a compact disc (CD), a digital versatile disc (DVD), or the like.

Programs, data, and the like stored in the auxiliary storage device 303 are read into the main storage device 302 as needed.

The input device 304 is a user interface that receives information from a user. The input device 304 is, for example, a keyboard, a mouse, a card reader, or a touch panel.

The output device 305 is a user interface that outputs various types of information (display output, audio output, print output, or the like). The output device 305 is, for example, a display device that visualizes various types of information, an audio output device (speaker), or a printing device. The display device is a liquid crystal display (LCD), a graphic card, or the like.

The communication device 306 is a communication interface that communicates with another device via a communication medium. The communication device 306 is, for example, a network interface card (NIC), a wireless communication module, a universal serial interface (USB) module, or a serial communication module. The communication medium is, for example, a universal serial bus (USB), a communication medium conforming to various communication standards such as RS-232C, a local area network (LAN), a wide area network (WAN), the Internet, or a dedicated line. A configuration of the communication medium is not necessarily limited. The communication device 306 can also function as an input device that receives information from another device that is communicably connected. The communication device 306 can also function as an output device that transmits information to another device that is communicably connected.

Functions of the object recognition apparatus 220 (the input unit 221, the processing unit 222, the output unit 223, and the like) may be implemented by, for example, the processor 301 reading programs stored in the auxiliary storage device 303 to the main storage device 302 and executing the programs (software), may be implemented by hardware such as a dedicated circuit, or may be implemented by a combination of software and hardware. One function of the object recognition apparatus 220 may be divided into a plurality of functions, or a plurality of functions may be integrated into one function. Some of the functions of the object recognition apparatus 220 may be provided as separate functions or may be included in other functions. Some of the functions of the object recognition apparatus 220 may be implemented by another computer capable of communicating with the object recognition apparatus 220. For example, some or all of the functions of the object recognition apparatus 220 may be implemented by the robot 210 or may be implemented by cloud computing.

FIG. 4 is a diagram showing an example of object recognition processing (the input processing 110, the selection processing 120, and the output processing 130) executed by the object recognition apparatus 220.

In step S401, the object recognition apparatus 220 receives scene information. The scene information includes the estimation result 111.

In step S402, the object recognition apparatus 220 creates a histogram based on the scene information. In the histogram, a horizontal axis represents a class, a vertical axis represents a frequency, and a frequency of each class is represented by a bin (for example, a rectangular column). A class is provided with a label value indicating the class. For a class, either a case where the class is indicated by a unique value or a case where the class is indicated by a range (predetermined increment) may be used. For example, when there is provided a predetermined class in which a vertical range of the class is "10.00 cm to 10.99 cm" and a horizontal range of the class is "8.00 cm to 8.99 cm", "10 cm×8 cm" is provided as a label value.

Here, for example, when the scene information includes data on a specific object estimated to have a vertical length of "10.01 cm" and a horizontal length of "8.16 cm", since the specific object belongs to the predetermined class described above, the object recognition apparatus 220 adds "1" to a frequency of the predetermined class.

The object recognition apparatus 220 may include an interface that allows the user to set a predetermined increment. This interface, for example, allows the user to set a hyper parameter (allowable error).

In step S403, the object recognition apparatus 220 selects an object based on the histogram created in step S402. For example, the object recognition apparatus 220 takes a majority vote of a class and estimates a label value of the class having the highest frequency as a size of an object allowable in the target scene. For example, when the class having the highest frequency is the predetermined class described above, the object recognition apparatus 220 estimates "10 cm×8 cm" given as a label value of the predetermined class as the size of the object.

In step S404, the object recognition apparatus 220 generates the recognition result 131 based on a result (selection result 121) selected in step S403 and outputs the recognition result 131. The object recognition apparatus 220 may transmit the recognition result 131 to the robot 210, display the recognition result 131 on the output device 305, or transmit the recognition result 131 to another computer.

FIG. 5 is a diagram showing an example of a result of processing executed in the object recognition processing (result image).

A result image 510 shows an example of the estimation result 111. As shown in the result image 510, the estimation result 111 includes, for each object provided in the target scene, an ID for identifying an object and a value indicating a size of the object. The result image 510 shows an example in which the object has a box shape, and parameters indicating the size of the object are length and width. However, the size of the object may include a combination of parameters other than length and width, such as a height parameter.

A result image 520 shows an example of the selection result 121. As shown in the result image 520, the selection result 121 includes information indicating a result of voting based on strict numerical value matching, a result of voting based on a histogram with a predetermined increment (for example, an increment of 1 cm), and the like.

A result image 530 shows an example of the recognition result 131. As shown in the result image 530, the recognition result 131 includes information that can be regarded as a size of an object selected as an object having an allowable size in the target scene (for example, an ID of an object).

According to the present embodiment, it is possible to exclude an estimation result of an object having an unallowable size in the target scene from estimation results included in the scene information, and to correctly select an estimation result of the object having the allowable size in the target scene.

(II) Second Embodiment

The present embodiment is different from the first embodiment mainly in that an object recognition apparatus 600 generates the estimation result 111. In the present embodiment, the same components as those in the first embodiment are denoted by the same reference signs, and description thereof will be omitted.

FIG. 6 is a diagram showing an example of a configuration of the object recognition apparatus 600 according to the present embodiment.

The object recognition apparatus 600 is connected to one or more sensors 601 that acquire a state (a physical phenomenon, a chemical phenomenon, or the like) of the storage box 211. The object recognition apparatus 600 includes an input unit 611, a processing unit 222, and an output unit 223. The processing unit 222 includes a size estimation unit 612 and a posture estimation unit 613.

The input unit 611 inputs sensor information acquired by the sensor 601. The sensor information is an example of scene information indicating a target scene, and includes a color image, a point cloud, a depth image, a grayscale image, a combination thereof, or the like. The size estimation unit 612 estimates a size of an object in the target scene. The posture estimation unit 613 estimates a posture of the object in the target scene.

In the following description, it is assumed that a shape of the object is an original shape, and objects are stored in the storage box 211 without being aligned. The original shape is a combination of parameters for indicating the shape of the object, such as length, width, and depth. That is, when the shape of the object is the original shape, it can be said that a size of the object is a combination of values of parameters representing the original shape.

Here, original shape information 614 including information indicating parameters representing the original shape of the object is registered in the object recognition apparatus 600. The parameters representing the original shape of the object are length, width, and height, or length and width when the original shape is a box shape, are radius and height, radius, or height when the original shape is a cylindrical shape, and are radius when the original shape is a spherical shape. For example, when the original shape is a box shape, the object recognition apparatus 600 can estimate box-shaped objects having various sizes. The original shape is not limited to the examples described above, and may be other original shapes such as a triangular prism shape or a combination of the original shapes described above.

The configuration of the object recognition apparatus 600 is not limited to the configuration described above. For example, the object recognition apparatus 600 may not be directly connected to the sensor 601, and may be connected to a device connected to the sensor 601 (indirectly connected). For example, the object recognition apparatus 600 may not include the posture estimation unit 613.

FIG. 7 is a diagram showing an example of object recognition processing executed by the object recognition apparatus 600.

In step S701, the object recognition apparatus 600 receives scene information from the sensor 601. The scene information may be transmitted from the sensor 601 at a first timing, or may be acquired in response to a request from the object recognition apparatus 600 at a second timing. The first timing may be constant, a timing at which an order is received, periodic, a time designated in advance, or a timing instructed by the user. The second timing may be the same timing as the first timing or a timing different from the first timing.

In step S702, the object recognition apparatus 600 extract a region based on the scene information received in step S701 and cuts out an object point group estimated to constitute an object. For example, the object recognition apparatus 600 divides the region for each object by instant segmentation and recognizes a type of the object. For example, the object recognition apparatus 600 classifies pixels of an image to which of a plurality of instances the pixels belong (cuts out an object point group having (x, y, z) coordinates distributed in a three-dimensional space). The object recognition apparatus 600 may execute segmentation using another method such as watershed. The region extraction is not limited to using instant segmentation, and an object detection method such as binarized normed gradients (BING) may be used.

In step S703, the object recognition apparatus 600 estimates a surface constituting the object. For example, the object recognition apparatus 600 reads out the original shape information 614, uses an original shape of the object to obtain at least one surface most closely matching the object point group cut out in step S702 using a method such as random sample consensus (RANSAC), checks whether the obtained surface satisfies a rule to be satisfied for each original shape of the object, and cuts out a point group constituting the object. The rule to be satisfied for each original shape of the object is, for example, a rule that can be satisfied as long as the object has an original shape in which the obtained surfaces are orthogonal to each other when the original shape of the object is a box shape.

In step S704, the object recognition apparatus 600 estimates a size. The object recognition apparatus 600 estimates the size of the object based on the point group constituting the object estimated in step S703. For example, when the original shape of the object is a box shape, a minor axis and a major axis of the point group are the size of the object if the point group constituting the object is one surface. When the point group constituting the object is two surfaces or three surfaces, a length of each axis of a three-dimensional rectangle having the smallest volume among three-dimensional rectangles covering the point group is the size of the object.

In step S705, the object recognition apparatus 600 estimates a posture. For example, the object recognition apparatus 600 creates a point group (a model of an original shape) for the size of the object estimated in step S703, and estimates the posture of the object (for example, estimates a rotation matrix and a parallel movement matrix) using an algorithm (for example, an iterative closest point (ICP)) for minimizing a distance between the point group constituting the object cut out in step S702 and a point group in the model of the original shape.

Steps S402 to S404 are described in the first embodiment, and description thereof will be omitted.

FIG. 8 is a diagram showing an example of a result of processing executed in the object recognition processing (result image).

A result image 810 shows an example of a result (scene information) of inputting the sensor information acquired by the sensor 601 in step S701. Here shows that a color image and a point group are used as the sensor information included in the scene information.

A result image 820 shows an example of a result (estimation result) of estimating the size of the object in step S704. As shown in the result image 820, the estimation result includes, for each object provided in the target scene, an ID for identifying the object and a value indicating the size of the object. The result image 820 shows an example in which the object has a box shape, and parameters indicating the size of the object are length and width. However, the size of the object may include a combination of parameters other than length and width, such as a height parameter. The estimation result may include a result of estimating the posture of the object in step S705.

According to the present embodiment, it is possible to estimate the size of the object based on the sensor information on the target scene, and to detect the object having an unallowable size in the target scene.

(III) Third Embodiment

The present embodiment is different from the second embodiment mainly in that a size of an object and a posture of the object are estimated simultaneously. In the present embodiment, the same components as those in the second embodiment are denoted by the same reference signs, and description thereof will be omitted.

FIG. 9 shows an example of a configuration of an object recognition apparatus 900 according to the present embodiment.

The object recognition apparatus 900 includes the input unit 611, the processing unit 222, and the output unit 223. The processing unit 222 includes a size and posture estimation unit 911.

The size and posture estimation unit 911 estimates a size and a posture of an object based on scene information received from the input unit 611.

FIG. 10 is a diagram showing an example of object recognition processing executed by the object recognition apparatus 900.

In step S1001, the object recognition apparatus 900 executes fitting. More specifically, the object recognition apparatus 900 calculates an error between the point group constituting the object cut out in step S702 and a model (for example, a box point group) of an original shape created as desired. For example, the object recognition apparatus 900 estimates the posture of the object using an algorithm (for example, ICP) that minimizes a distance between point groups. At this time, the object recognition apparatus 900 calculates a distance between a certain point in the model of the original shape and the closest point in the object point group by decomposing the distance in an x axis direction, a y axis direction, and a z axis direction, and sets an average of distances for each axis calculated for all points as an error for each axis.

In step S1002, the object recognition apparatus 900 determines whether an end condition is satisfied. When the object recognition apparatus 900 determines that the end condition is satisfied, the processing proceeds to step S402, and when the object recognition apparatus 900 determines that the end condition is not satisfied, the processing proceeds to step S1003. The end condition is, for example, that all errors for each axis calculated in step S1002 are equal to or smaller than a threshold, that the processing in step S1001 is executed a predetermined number of times, or the like.

In step S1003, the object recognition apparatus 900 executes parameter adjustment, and the processing proceeds to step S1001. For example, the object recognition apparatus 900 changes a value of a parameter of the model of the original shape in a direction in which an error is the largest among the x axis direction, the y axis direction, and the z axis direction (for example, halving the value or doubling the value).

In this way, the object recognition apparatus 900 estimates the posture of the object and the size of the object by repeating the fitting and the parameter adjustment.

According to the present embodiment, it is possible to estimate the size of the object and the posture of the object simultaneously, and to detect the object having an unallowable size in the target scene.

(IV) Fourth Embodiment

The present embodiment is different from the second embodiment mainly in that a size of an object is estimated and selected, and when an object (referred to as a "foreign object") having an unallowable size in a target scene is detected, the foreign object is presented to the user. In the present embodiment, the same components as those in the second embodiment are denoted by the same reference signs, and description thereof will be omitted.

FIG. 11 is a diagram showing an example of processing executed by an object recognition apparatus 1100 according to the present embodiment.

The object recognition apparatus 1100 executes input processing 1110, estimation processing 1120, selection processing 1130, foreign object detection processing 1140, and output processing 1150.

In the input processing 1110, the object recognition apparatus 1100 receives scene information. The scene information includes sensor information 1111. The sensor information 1111 includes a color image, a point group, and the like acquired by the sensor 601.

In the estimation processing 1120, the object recognition apparatus 1100 estimates a size of an object provided in a target scene and generates an estimation result 1121. At this time, the object recognition apparatus 1100 may estimate a posture of the object.

In the selection processing 1130, the object recognition apparatus 1100 selects an object having an allowable size in the target scene using the estimation result 1121 for the target scene (entire scene) and generates a selection result 1131. The selection result 1131 includes information 1132 indicating the object having the allowable size in the target scene and information 1133 indicating a foreign object. For example, the object recognition apparatus 1100 selects the object allowable in the target scene and the foreign object by voting sizes of a plurality of objects.

In the foreign object detection processing 1140, when a foreign object is detected in the selection processing 1130, the object recognition apparatus 1100 specifies the foreign object among objects included in the sensor information 1111 and generates foreign object information 1141 as information indicating the specified foreign object. The foreign object information 1141 may be an ID or the like capable of identifying an object having an unallowable size in the target scene.

In the output processing 1150, the object recognition apparatus 1100 outputs a recognition result 1151 including the foreign object information 1141. The recognition result 1151 is displayed on the output device 305. The recognition result 1151 may be displayed on a tablet terminal possessed by the user, a display provided in a warehouse, or the like. According to this display, the user can recognize the foreign object in the storage box 211 and remove the foreign object from the storage box 211.

In addition to or instead of a configuration of presenting the recognition result 1151 to the user, the object recognition apparatus 1100 may present the recognition result 1151 to the robot 210, and the robot 210 may grip and remove the foreign object to maintain consistency of objects in the storage box 211.

In the present embodiment, presence or absence of an object having a size that is not originally present in the storage box is determined, and the determination result is output. According to the present embodiment, for example, when objects are stored in the storage box, even if an erroneous object enters the storage box due to a human error or the like, the object can be removed from the storage box.

(V) Fifth Embodiment

The present embodiment is mainly different from the second embodiment in that a plurality of types of objects are stored in the storage box. In the present embodiment, the same components as those in the second embodiment are denoted by the same reference signs, and description thereof will be omitted.

FIG. 12 is a diagram showing an example of processing executed by an object recognition apparatus 1200 according to the present embodiment.

The object recognition apparatus 1200 executes input processing 1210, estimation processing 1220, selection processing 1230, and output processing 1240.

In the input processing 1210, the object recognition apparatus 1200 receives scene information. The scene information includes sensor information 1211 and presence information 1212. The sensor information 1211 includes a color image, a point group, and the like acquired by the sensor 601. The presence information 1212 includes information ("2" in this example) indicating the number of objects of the same type present in a target scene.

In the estimation processing 1220, the object recognition apparatus 1200 estimates a size of an object provided in the target scene and generates an estimation result 1221. At this time, the object recognition apparatus 1200 may estimate a posture of the object.

In the selection processing 1230, the object recognition apparatus 1200 selects an object having an allowable size in the target scene using the estimation result 1221 for the target scene (entire scene) and the presence information 1212, and generates a selection result 1231.

For example, when the presence information 1212 is "2", the object recognition apparatus 1200 sets objects having top two sizes as objects having the allowable size (objects having a first size and objects having a second size) in the target scene and selects objects having remaining sizes as foreign objects by voting sizes of the plurality of objects. When the number of objects having one size is smaller than a threshold (for example, three), the object recognition apparatus 1200 may select objects having the size as foreign objects even if the objects have the top two sizes.

In this example, the selection result 1231 includes information 1232 and 1233 indicating an object allowable in the target scene. In other words, the selection result 1231 may include information indicating a foreign object.

In the output processing 1240, the object recognition apparatus 1200 generates a recognition result 1241 based on the selection result 1231 and outputs the recognition result 1241. The recognition result 1241 is displayed on the output device 305. The recognition result 1241 may be displayed on a tablet terminal possessed by the user, a display provided in a warehouse, or the like. According to this display, the user can recognize the foreign object in the storage box 211 and remove the foreign object from the storage box 211.

In the present embodiment, by additionally inputting the number of sizes of the objects in the storage box, a plurality of sizes are allowable and the estimation result is selected, and thus it is possible to detect an object having an unallowable size in the storage box even if objects of two or more types are stored in the storage box.

(VI) Appendix

The embodiments described above include, for example, the following contents.

In the embodiments described above, the invention is applied to the object recognition apparatus, but the invention is not limited thereto, and can be widely applied to various systems, apparatuses, robots, methods, and programs.

In the embodiments described above, some or all of the programs may be installed from a program source into a device such as a computer that implements the object recognition apparatus. The program source may be, for example, a program distribution server or a computer-readable recording medium (for example, a non-transitory recording medium) connected via a network. In the above description, two or more programs may be implemented as one program, or one program may be implemented as two or more programs.

In the embodiments described above, the shown and described screens are merely examples, and any design may be used as long as the same information is received.

In the embodiments described above, the shown and described screens are merely examples, and any design may be used as long as the same information is presented.

In the embodiments described above, a case where an average value is used as a statistical value has been described, but the statistical value is not limited to the average value, and may be other statistical values such as a maximum value, a minimum value, a difference between the maximum value and the minimum value, a mode value, a median value, and a standard deviation.

In the embodiments described above, output of information is not limited to displaying on the display. The output of the information may be audio output by a speaker, output to a file, printing on a paper medium or the like by a printing device, projection on a screen or the like by a projector, or other modes.

In the above description, information such as a program for implementing each function, a table, and a file may be stored in a storage device such as a memory, a hard disk, and a solid state drive (SSD), or a recording medium such as an IC card, an SD card, and a DVD.

The embodiments described above have, for example, the following characteristic configurations.

(1) An object recognition apparatus (for example, the object recognition apparatus 220, the object recognition apparatus 600, the object recognition apparatus 900, the object recognition apparatus 1100, and the object recognition apparatus 1200) includes: an input unit (for example, the input unit 221, the input unit 611, a circuit, an object recognition apparatus, and a computer) configured to input scene information (the estimation result 111 of an object, the sensor information 1111, the sensor information 1211, a color image, a point group, and the like) indicating a state of a predetermined scene in a container (for example, the storage box 211) that stores an object; a processing unit (for example, the processing unit 222, a circuit, an object recognition apparatus, and a computer) configured to execute processing of selecting an object present in the container for each size based on the scene information received from the input unit, and detecting an object having a size unallowable for storage in the container based on the number of selected objects for each size; and an output unit (for example, the output unit 223, a circuit, an object recognition apparatus, and a computer) configured to output a result of the processing executed by the processing unit.

In the above configuration, regarding size information indicating a size of the object provided in the predetermined scene, the size information estimated by another computer may be included in the scene information, or may be estimated based on sensor information included in the scene information.

In the above configuration, since the object having the size unallowable for storage in the container is detected based on the number of objects for each size, for example, even when there is no reference object model, it is possible to exclude, from the container, the object having the size unallowable for storage in the container. According to the above configuration, it is possible to detect the object having the size unallowable for storage in the container without creating an object model in which the size, color, texture, and the like of the object are set for each object.

(2) The scene information received from the input unit includes at least one of a color image, a point group, a depth image, and a grayscale image, and the processing unit estimates a size of the object present in the container based on the scene information received from the input unit and selects the object present in the container for each size based on the estimated size of the object (see FIGS. 7 and 10).

In the above configuration, since the size of the object is estimated based on at least one piece of information among the color image, the point group, the depth image, and the grayscale image, and the object present in the container is selected for each size, the object present in the container can be selected for each size by inputting the information to the object recognition apparatus, for example.

(3) A size of the object present in the container is a combination of values of parameters representing an original shape of the object, and the processing unit selects the object present in the container for each combination of the values of the parameters representing the original shape based on the scene information received from the input unit (see FIGS. 5 and 8).

In the above configuration, since the object is selected using the values of the parameters representing the original shape, for example, as compared with a case where the object is selected using a region where the object is present (a region where the object occupies a space), sizes of the objects can be easily compared with one another, and the object can be easily selected.

(4) The parameters representing the original shape are length, width, and height, or length and width when the original shape is a box shape, and are radius and height, radius, or height when the original shape is a cylindrical shape.

(5) The processing unit creates a histogram indicating a frequency distribution of the object present in the container according to a predetermined range set for each parameter representing the original shape and determined to have the same parameter value, and detects the object having the size unallowable for storage in the container based on the number of elements in each bin of the created histogram (see FIGS. 4, 7, 10, and the like).

In the above configuration, since objects having a combination of values of parameters belonging to the predetermined range are determined to be objects having the same size, a user can set a hyper parameter (allowable error) by providing an interface for setting the predetermined range, for example.

(6) The scene information received from the input unit includes sensor information (a color image, a point group, a depth image, a grayscale image, a combination thereof, and the like) on a state of the container acquired by a sensor, and the processing unit estimates a size of the object present in the container based on the sensor information included in the scene information received from the input unit and selects the object present in the container for each size based on the estimated size of the object (see FIGS. 7 and 10).

In the above configuration, since the size of the object is estimated from the sensor information, and the object present in the container is selected for each size, the object present in the container can be selected for each size by directly or indirectly connecting the sensor to the object recognition apparatus, for example.

(7) A size of the object present in the container is a combination of values of parameters representing an original shape of the object, and the processing unit estimates the values of the parameters representing the original shape as the size of the object present in the container based on the sensor information included in the scene information received from the input unit (see FIGS. 7 and 10).

In the above configuration, since the size of the object is estimated using the values of the parameters representing the original shape, for example, as compared with a case where the size of the object is estimated using a region where the object is present, sizes of the objects can be easily compared with one another, and the object can be easily selected.

(8) The processing unit estimates a posture of the object using the estimated size of the object, and the output unit outputs the size of the object and the posture of the object that are estimated by the processing unit (see FIG. 7 and the like).

In the above configuration, since the size of the object and the posture of the object are output, for example, a robot can move a hand thereof toward the object having the size unallowable for storage in the container without colliding, grip the object, and then take out the object from the container while avoiding obstacles such as other objects.

(9) The processing unit estimates the posture of the object by aligning the estimated size of the object with a model of the original shape (see FIG. 7 and the like).

In the above configuration, since the posture of the object is estimated by aligning the estimated size of the object with the model of the original shape, for example, even when there is no reference object model, the posture of the object can be estimated by creating the model of the original shape.

(10) A size of the object present in the container is a combination of values of parameters representing an original shape of the object, the scene information received from the input unit includes sensor information on a state of the container acquired by a sensor, and the processing unit estimates the size of the object and a posture of the object by repeatedly executing fitting between a model of the original shape and an object point group obtained by cutting out the object from the sensor information included in the scene information received from the input unit, and adjustment of values of parameters of the model of the original shape (see FIG. 10 and the like).

According to the above configuration, for example, even when there is no reference object model, the size of the object and the posture of the object can be estimated by creating the model of the original shape.

(11) The output unit outputs information indicating the object having the size unallowable for storage in the container, the object being detected by the processing unit (see FIG. 11 and the like).

In the above configuration, since the information indicating the object having the size unallowable for storage in the container is output, for example, the user or the robot can exclude, from the container, the object having the size unallowable for storage in the container.

(12) The input unit inputs presence information (for example, the presence information 1212) indicating the number of types of objects present in the container, and the processing unit detects the object having the size unallowable for storage in the container based on the presence information (see FIG. 12 and the like).

In the above configuration, since the object having the size unallowable for storage in the container is detected based on the presence information, for example, even when objects having a plurality of sizes are stored in the container, the object having the size unallowable for storage in the container can be detected.

The configurations described above may be appropriately changed, recombined, combined, or omitted within a range not exceeding the gist of the invention.

It should be understood that items included in a list in a form of "at least one of A, B, and C" may be (A), (B), (C), (A and B), (A and C), (B and C), or (A, B, and C). Similarly, items listed in a form of "at least one of A, B, or C" may be (A), (B), (C), (A and B), (A and C), (B and C), or (A, B, and C).

REFERENCE SIGNS LIST

220: object recognition apparatus
221: input unit
222: processing unit
223: output unit

The invention claimed is:

1. An object recognition apparatus comprising:
an input unit configured to input scene information indicating a state of a predetermined scene in a container that stores an object;
a processing unit configured to execute processing of selecting an object present in the container for each size based on the scene information received from the input unit, and detecting an object having a size unallowable for storage in the container based on the number of selected objects for each size; and
an output unit configured to output a result of the processing executed by the processing unit;
wherein a size of the object present in the container is a combination of values of parameters representing an original shape of the object;
wherein the processing unit selects the object present in the container for each combination of the values of the parameters representing the original shape of the object based on the scene information received from the input unit; and
wherein the processing unit creates a histogram indicating a frequency distribution of the object present in the container according to a predetermined range set for each parameter representing the original shape of the object and determined to have the same parameter value, and detects the object having the size unallowable for storage in the container based on the number of elements in each bin of the created histogram.

2. The object recognition apparatus according to claim 1, wherein
the scene information received from the input unit includes at least one of a color image, a point group, a depth image, and a grayscale image, and
the processing unit estimates the size of the object present in the container based on the scene information received from the input unit and selects the object present in the container for each size based on the estimated size of the object.

3. The object recognition apparatus according to claim 1, wherein
the scene information received from the input unit includes sensor information on a state of the container acquired by a sensor, and
the processing unit estimates the size of the object present in the container based on the sensor information included in the scene information received from the input unit and selects the object present in the container for each size based on the estimated size of the object.

4. The object recognition apparatus according to claim 3, wherein
the processing unit estimates the values of the parameters representing the original shape of the object as the size of the object present in the container based on the sensor information included in the scene information received from the input unit.

5. The object recognition apparatus according to claim 4, wherein
the processing unit estimates a posture of the object using the estimated size of the object, and
the output unit outputs the size of the object and the posture of the object that are estimated by the processing unit.

6. The object recognition apparatus according to claim 5, wherein
the processing unit estimates the posture of the object by aligning the estimated size of the object with a model of the original shape of the object.

7. The object recognition apparatus according to claim 1, wherein
the scene information received from the input unit includes sensor information on a state of the container acquired by a sensor, and
the processing unit estimates the size of the object and a posture of the object by repeatedly executing fitting between a model of the original shape of the object and an object point group obtained by cutting out the object from the sensor information included in the scene information received from the input unit, and adjustment of values of parameters of the model of the original shape of the object.

8. The object recognition apparatus according to claim 1, wherein
the output unit outputs information indicating the object having the size unallowable for storage in the container, the object being detected by the processing unit.

9. The object recognition apparatus according to claim 1, wherein
the input unit inputs presence information indicating the number of types of objects present in the container, and
the processing unit detects the object having the size unallowable for storage in the container based on the presence information.

10. The object recognition apparatus according to claim 1, wherein
the parameters representing the original shape of the object are length, width, and height, or length and width when the original shape of the object is a box shape, and are radius and height, radius, or height when the original shape of the object is a cylindrical shape.

11. An object recognition method comprising:

inputting, by an input unit, scene information indicating a state of a predetermined scene in a container that stores an object;

executing, by a processing unit, processing of selecting an object present in the container for each size based on the scene information received from the input unit, and detecting an object having a size unallowable for storage in the container based on the number of selected objects for each size; and outputting, by an output unit, a result of the processing executed by the processing unit;

wherein a size of the object present in the container is a combination of values of parameters representing an original shape of the object;

wherein the processing unit selects the object present in the container for each combination of the values of the parameters representing the original shape of the object based on the scene information received from the input unit; and wherein the processing unit creates a histogram indicating a frequency distribution of the object present in the container according to a predetermined range set for each parameter representing the original shape of the object and determined to have the same parameter value, and detects the object having the size unallowable for storage in the container based on the number of elements in each bin of the created histogram.

\*    \*    \*    \*    \*